Figure 1:
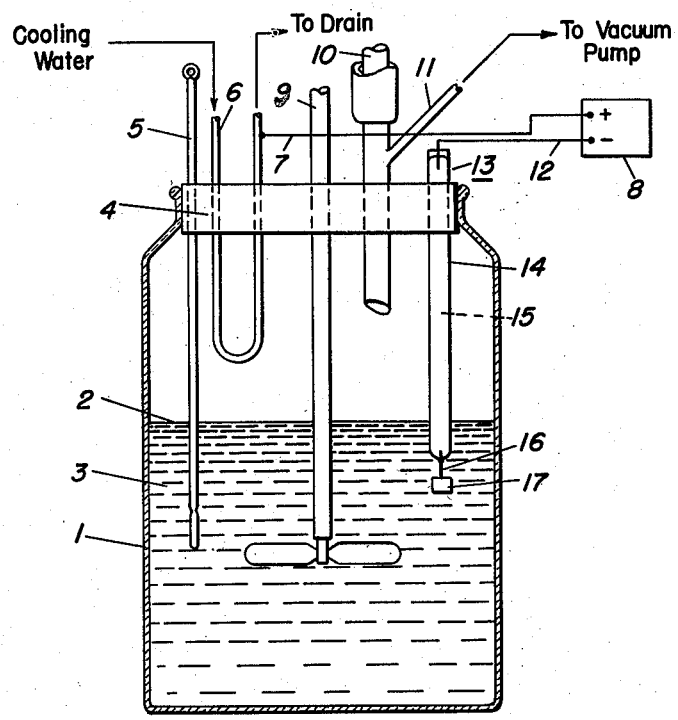
Figure 2:
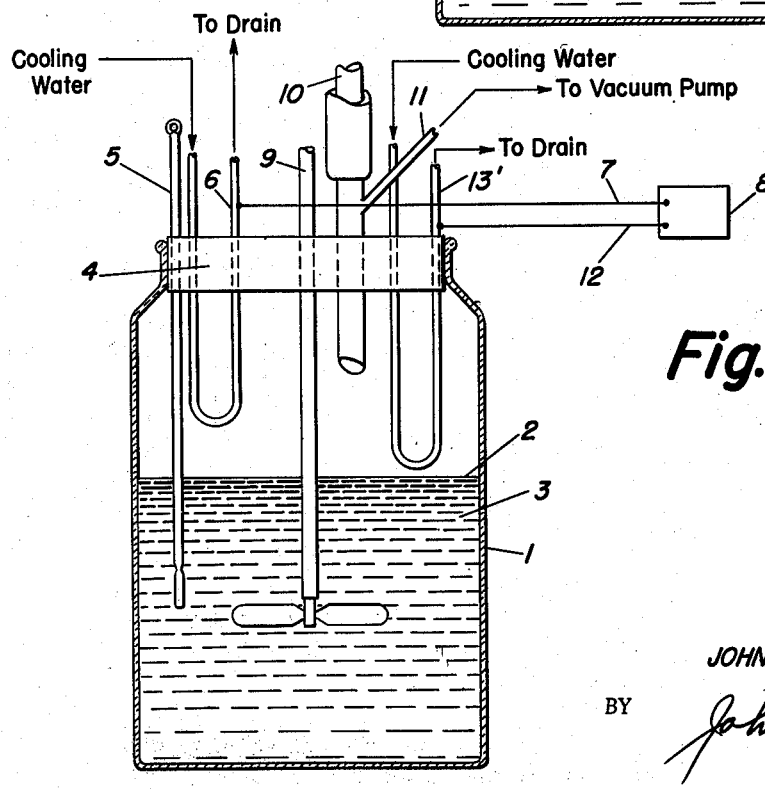

March 24, 1953  J. F. WOODMAN  2,632,729
POLYMERIZATION BY GLOW-DISCHARGE ELECTROLYSIS
Filed July 2, 1949

INVENTOR.
JOHN F. WOODMAN
BY John F. Bergin
ATTORNEY.

Patented Mar. 24, 1953

2,632,729

UNITED STATES PATENT OFFICE 2,632,729

POLYMERIZATION BY GLOW-DISCHARGE ELECTROLYSIS

John F. Woodman, Feasterville, Pa., assignor to Rohm & Haas Company, Philadelphia, Pa., a corporation of Delaware Application July 2, 1949, Serial No. 102,932

5 Claims. (Cl. 204—72)

This invention relates to a process for polymerizing liquid, polymerizable materials containing a vinylidene group. It relates to a process wherein ethylenically unsaturated organic compounds which undergo addition polymerization are polymerized by gas-discharge electrolysis.

An object of this invention is to provide a means of polymerizing said monomeric materials at low temperatures. Another object is to bring about polymerization without the addition of a catalyst which remains in the polymer. Still another object is to bring about polymerization by means of electrical energy.

These and other objects are accomplished by the process of this invention which comprises dispersing the polymerizable liquid in an aqueous solution of an electrolyte, stirring or circulating the resultant dispersion, preferably reducing the gaseous pressure above the surface of said dispersion to less than about 125 mm. of mercury, subjecting said circulating dispersion to electrolysis, preferably to glow-discharge electrolysis, by the passage of an electric current between a positive electrode placed immediately above the surface of said dispersion and a negative electrode so positioned that the electric current passes through the dispersion and through the gas space which is between the positive electrode and the surface of the dispersion. It is preferred that the negative electrode be immersed in the dispersion.

This may be better understood from a reference to the drawing in which Figure I illustrates the preferred apparatus in which the process is carried out, and Figure II illustrates a modification of the apparatus. Figures I and II differ as regards the positioning of the electrodes since in Figure I the negative electrode is immersed whereas in Figure II both electrodes are above the surface of the dispersion.

Thus, by way of illustration, an aqueous dispersion or emulsion of a liquid, monomeric, polymerizable compound, which has in its chemical structure a vinylidene group, $CH_2=C<$, is prepared, preferably with the aid of an emulsifying or dispersing agent. Reference is now made for the sake of illustration to Figure I of the drawing. In the case of a batch process, the dispersion 3 is placed in a container 1 to a level 2. The container 1 is fitted with a stopper 4 through which extends a thermometer 5, a water-cooled, tubular electrode 6 which is connected by wire 7 to the positive terminal of a source of electricity 8, an agitator 9, a reflux condenser 10 which has a side-arm 11 connected to a vacuum pump (not shown), and a negative electrode 13, made up of a glass tube 14 which is filled with mercury 15 and in the end of which tube is sealed a metal wire 16, preferably of platinum, to which wire in turn is attached a square piece of platinum foil, 17. Electrode 6 is positioned in the space above the level 2 of the dispersion and electrode 13 is submerged in the dispersion. A small amount of a soluble ionizable compound; i. e. an electrolyte, is added to the aqueous dispersion or emulsion, if necessary, in order to make the aqueous dispersion capable of conducting an electric current. In many cases the dispersing or emulsifying agent supplies the necessary ions. The starting of the process may be facilitated by evacuating the space above the surface to a pressure of 125 mm. of mercury or less. A high potential is applied to the electrodes so that an electrical discharge is set up across the space between the surface of the liquid and the electrode above it. The electric current is carried between the electrodes by the electrons and ions in the gaseous space between the surface of the liquid and the electrode above it and by the ions in the aqueous dispersion. Polymerization begins at once and continues during exposure to the discharge until the available monomeric material is converted to polymer. Cooling may be necessary, especially when small volumes of the dispersion are employed. A very convenient method of isolating the polymeric product is to mix the dispersion with a water-miscible organic liquid which is a solvent for the monomeric material. Methanol is particularly suitable for this purpose. Only the polymer then remains in suspension and can be readily filtered off, washed, and dried.

By the process of this invention, it is now possible to prepare polymers rapidly and efficiently at ordinary room temperatures, or at even lower temperatures. The polymers are obtained in the form of fine particles dispersed in the aqueous medium. They are readily freed of the aqueous medium by conventional and convenient methods such as precipitation, coagulation, extraction, filtration and the like and thereafter can be milled or molded or dissolved in organic solvents. The polymers so produced do not contain any residual catalyst which in many instances is responsible for changes in polymers on ageing or on being fabricated.

This process is especially valuable to the research chemist because it provides a means of studying the course of the polymerization. At any instant the reaction can be stopped by the mere throwing of a switch which interrupts the current and extinguishes the discharge. Since there is no catalyst present, the reaction stops and the ratio of reactants to polymeric product or the polymeric nature of the product is readily determined by analysis.

The monomeric materials which are readily polymerized by the process of this invention are those which undergo addition polymerization and which are vinylidene compounds containing an olefinic group in the molecule. They are liquid at the temperature of operation and are insoluble in water. Such polymerizable monomers are typified by the following: Acrylic and methacrylic esters of alcohols containing up to 18 carbon atoms, such as methyl, ethyl, isobutyl, tert.-amyl, benzyl, 2-ethylhexyl, sec.-decyl, lauryl and octadecyl acrylates and methacrylates; vinyl esters of carboxylic acids containing up to 18 carbon atoms, such as the vinyl esters of acetic, propionic, butyric, benzoic, hexanoic, lauric, and oleic acids; styrene and nuclearly chlorinated styrenes; vinyl naphthalene; vinyl ethers such as the vinyl ethers of the alcohols listed above in connection with the acrylic and methacrylic acid esters; allyl esters such as allyl stearate; and vinyl ketones. The monomers which are operable in this process all contain at least one vinylidene group, $CH_2=<$, and are liquids, and are water-insoluble. Compounds containing even two vinylidene groups; e. g. diallyl phthalate and butadiene, can also be polymerized. These are the factors which make for success in polymerizing the monomer rather than any particular chemical configuration; and the list above is merely illustrative and is not to be considered as containing the names of all of the monomeric compounds which can be advantageously polymerized by this process. Likewise, copolymers are prepared by subjecting a mixture of copolymerizable monomers to gas discharge electrolysis. Examples of such mixtures are ethyl acrylate, and methyl methacrylate, vinyl chloride and vinyl acetate, and vinyl chloride and vinylidene chloride.

In preparing the aqueous dispersions of the monomeric liquids it is recommended that an emulsifying or dispersing agent be employed. Conventional materials such as soaps or synthetic cationic, nonionic, or anionic surface-active agents can be used in the process of this invention just as they are used in emulsion and suspension polymerization of vinylidene compounds at elevated temperatures with peroxidic catalysts. Such surface-active agents are typified by sodium or potassium soaps of fat or oil acids, soluble sulfonates of higher alcohols or petroleum residues, quaternary ammonium salts or alkylated-phenoxy alkanols.

The function of the electrolyte in the aqueous dispersion of monomeric liquid is to provide ions which conduct the current of electricity through the dispersion. For this purpose any ionizable material can be used. Inorganic acids, bases, and salts are suitable, although in many cases it is preferred that the pH of the dispersion be above 7.0, so as not to affect the dispersing agent, which of course precludes the use of acids in such cases. Also, as indicated, the dispersing agent often provides enough ions so that further addition of electrolyte is unnecessary.

The electric current which is passed through the dispersion can be alternating or direct. When, however, a direct current is passed, it is necessary that the positive electrode be located in the gas space.

Although it is not necessary that the gaseous space above the liquid dispersion be at sub-atmospheric pressure in order for polymerization to take place, it has been found that lowering the pressure facilitates the starting and maintenance of the process. Pressures below 125 mm. of mercury are particularly recommended and at these pressures the discharge is of the kind known as a glow-discharge. Furthermore, the higher gaseous pressures require higher potentials. On the other hand, the greater the reduction in pressure, the greater is the vaporization of the volatile materials. Lower pressures should, therefore, be accompanied by lowered temperatures. Since the maintenance of the gas-discharge depends on both the gaseous pressure and the electrical potential, the most practical and convenient method of operating is to employ whatever potential is available and then apply suction to the container until a discharge is set up and thereafter to maintain this or other convenient pressure.

Although the process of this invention is the first in which liquid monomers are polymerized by gas-discharge electrolysis, it is not the first operation in which gas-discharge electrolysis has been employed. Consequently, the common knowledge of how suitable gas-discharges are set up and maintained or continued applies in connection with this process. And in view of the common knowledge on the subject of gas-discharge electrolysis, which applies here, it is to be understood that this invention does not reside in merely establishing a gaseous discharge but rather in utilizing gas-discharge electrolysis as the major step in a new process for polymerizing monomeric liquids.

This new method of making polymers is conducted at ordinary room temperatures. That is to say, the process is carried on without the application of external heat. In fact, it may often be desirable to apply cooling means in order to reduce the temperature—not because polymerization does not take place at higher temperatures but because higher temperatures give rise to higher gaseous pressures, due to the greater volatilization of the water and liquid monomer, which are less convenient for operation. The process is easily conducted at temperatures below room temperature and in this way polymerizable monomers which are gaseous at ordinary temperatures, such as vinyl chloride, vinylidene chloride or methyl vinyl ether, are readily converted into polymers without danger and without the need of pressure-resistant equipment. Temperatures from 10° C. to 40° C., and especially from 20° C. to 30° C., are recommended for the polymerization of those monomers which are ordinarily stored and shipped as liquids.

Since polymerization of the monomeric liquid is initiated only in the zone of impingement of the gas-discharge on the liquid surface, it is important that the dispersion of the monomer be circulated so that a fresh surface of dispersion is always exposed to the discharge. This can be done by agitation or stirring in the case of a batch process or by flowing in the case of a continuous process.

This general process of polymerizing liquid monomers by gas-discharge electrolysis is subject to many modifications in manipulation without departing from the spirit of this invention. For example, a plurality of electrodes may be used which increases the rate of polymerization by increasing the area of the zone in which the polymerization is initiated. Alternatively, the process can be adapted to continuous operation by flowing, for example, a stream of the dispersed monomer through one or more zones of gaseous discharge.

Furthermore, the process is also operative in an arrangement such as is shown in Figure II where both electrodes, which are alike and are numbered 6 and 13', are in position in the gaseous phase above the surface of the dispersions, but are separated from each other so that the current passes from one electrode through the gaseous phase to the surface of the dispersion, thence through the dispersion to another area of the surface which is adjacent to the second electrode, and finally from this latter area of surface through the gaseous phase to the second electrode. This particular arrangement is advantageous when alternating current is used, since at any instant there is always a positive electrode in the gaseous phase above the surface of the dispersion regardless of the direction of the current. In every case, however, the gas-discharge must be to the surface of the liquid. A discharge between two electrodes above the surface has no effect on the polymerization of the dispersed polymerizable material.

The following example illustrates how methyl methacrylate is polymerized by the process of this invention. The example also serves to show a method by which the other above-identified liquid, monomeric, polymerizable compounds containing a vinylidene group, $CH_2=<$, are likewise converted to polymers.

Example

A one-quart, wide-mouth bottle was equipped with mechanical stirrer, thermometer, a water-cooled reflux condenser the top of which was connected in turn to a vacuum pump, and two electrodes which were attached to a source of high potential direct current supply. The bottle was placed in a cold water bath. Into the bottle was poured an emulsion of 50 cc. of methyl methacrylate in 500 cc. of water to which had been added 10 cc. of an aqueous solution containing 25% of an emulsifying agent (octylphenoxy ethoxyethoxy ethyl sodium sulfonate) and 3% of sodium chloride. The anode, a U-shaped piece of nickel tubing having an outside diameter of 0.2 inch and a radius of curvature of 3/8 inch, was positioned about 3/4 inch above the surface of the emulsion. This electrode was cooled by an internally flowing stream of tap water. The cathode was made up of a 1/4 inch square of platinum foil attached to a platinum wire which was sealed through the lower end of a glass tube containing mercury. The upper end of the tube passed through a stopper and was connected to the negative terminal of the power supply. The platinum cathode was positioned well below the surface of the emulsion but as near as convenient to the portion of the liquid surface directly below the anode. Agitation was begun and the flask was evacuated to a pressure of 50 mm. of mercury. This pressure was maintained throughout the polymerization of the monomer. The power supply was then turned on and the potential at its terminals was gradually increased to about 2000 volts, when a visible discharge, commonly known as a glow-discharge, passed through the gaseous phase between the anode and the surface of the stirred emulsion. The voltage was then reduced to 900 volts which resulted in a current of about 300 milliamperes through the system. While the temperature of the emulsion was held at 25° C., the gas-discharge electrolysis was continued for an hour. Then the power supply was turned off and the contents of the flask were poured into a liter of methanol. This solution was then filtered and the precipitate was washed with warm methanol and dried. The yield of polymethyl methacrylate represented a 75% conversion of the monomer.

The process of this invention can be used to control the range of molecular weights of the polymeric particles. The polymerization is initiated by gas-discharge electrolysis during the short period of time that the monomer is in the zone of impingement of the visible, gaseous discharge. Propagation of the polymerization then occurs apart from the zone of discharge. The relative importance of initiation and propagation can be varied by changing the length of time or, rather, the proportion of time during which any particular volume of dispersed material is exposed to the discharge. Such variation can be controlled by the conditions of stirring and circulation and/or by making the discharge intermittent on a controlled schedule.

I claim:

1. A process for polymerizing a monomeric, liquid, water-insoluble material which contains a vinylidene group and which undergoes addition polymerization which comprises dispersing said monomeric liquid in an aqueous solution of an electrolyte, reducing the gaseous pressure above the surface of the dispersion to less than 125 mm. of mercury, circulating and subjecting said dispersion to glow-discharge electrolysis in which a glow-discharge between a positive electrode placed immediately above the surface of said dispersion and said surface is maintained by the passage of an electric current between said electrode and a negative electrode immersed in said aqueous dispersion.

2. A process for polymerizing monomeric methyl methacrylate which comprises dispersing said methyl methacrylate in an aqueous solution of an electrolyte, reducing the gaseous pressure above the surface of the dispersion to less than 125 mm. of mercury, circulating and subjecting said dispersion to glow-discharge electrolysis in which a glow-discharge between an electrode placed immediately above the surface of said dispersion and said surface is maintained by the passage of an electric current through said dispersion to said electrode from another electrode immersed in said aqueous dispersion.

3. A process for polymerizing monomeric styrene which comprises dispersing said styrene in an aqueous solution of an electrolyte, reducing the gaseous pressure above the surface of the dispersion to less than 125 mm. of mercury, circulating and subjecting said dispersion to glow-discharge electrolysis in which a glow-discharge between an electrode placed immediately above the surface of said dispersion and said surface is maintained by the passage of an electric current through said dispersion to said electrode from another electrode immersed in said aqueous dispersion.

4. A process for copolymerizing a mixture of monomeric methyl methacrylate and monomeric ethyl acrylate which comprises dispersing said monomeric materials in an aqueous solution of an electrolyte, reducing the gaseous pressure above the surface of the dispersion to less than 125 mm. of mercury, circulating and subjecting said dispersion to glow-discharge electrolysis in which a glow-discharge between an electrode placed immediately above the surface of said dispersion and said surface is maintained by the passage of an electric current through said dispersion to said electrode from another electrode immersed in said aqueous dispersion.

5. A process for polymerizing a monomeric, liquid, water-insoluble material which contains a vinylidene group and which undergoes addition polymerization which comprises dispersing said monomeric liquid in an aqueous solution of an electrolyte, circulating and subjecting said dispersion to glow-discharge electrolysis in which a glow-discharge between an electrode placed immediately above the surface of said dispersion and said surface is maintained by the passage of an electric current through said dispersion to said electrode from another electrode immersed in said dispersion.

JOHN F. WOODMAN.

REFERENCES CITED

The following references are of record in the file of this patent:

UNITED STATES PATENTS

| Number | Name | Date |
|---|---|---|
| 2,167,718 | Harris et al. | Aug. 1, 1939 |
| 2,191,797 | Matheson | Feb. 27, 1940 |
| 2,257,177 | Luster | Sept. 30, 1941 |

FOREIGN PATENTS

| Number | Country | Date |
|---|---|---|
| 130,608 | Great Britain | July 11, 1921 |

OTHER REFERENCES

Khain et al., Chemical Abstracts, vol. 33 (1939), p. 1912.

Shekhter et al., Chemical Abstracts, vol. 34 (1940), p. 5353.